(No Model.)

A. ROSEWATER.
FLUSHING TANK.

No. 343,069. Patented June 1, 1886.

WITNESSES
C. H. Durand
Edward Stanton

INVENTOR
Andrew Rosewater,
By Louis Bagger & Co.
Attorneys.

UNITED STATES PATENT OFFICE.

ANDREW ROSEWATER, OF OMAHA, NEBRASKA.

FLUSHING-TANK.

SPECIFICATION forming part of Letters Patent No. 343,069, dated June 1, 1886.

Application filed March 1, 1886. Serial No. 193,291. (No model.)

*To all whom it may concern:*

Be it known that I, ANDREW ROSEWATER, a citizen of the United States, and a resident of Omaha, in the county of Douglas and State of Nebraska, have invented certain new and useful Improvements in Flushing-Tanks; and I do hereby declare that the following is a full, clear, and exact description of the invention, which will enable others skilled in the art to which it appertains to make and use the same, reference being had to the accompanying drawings, which form a part of this specification, and in which—

Figure 1:
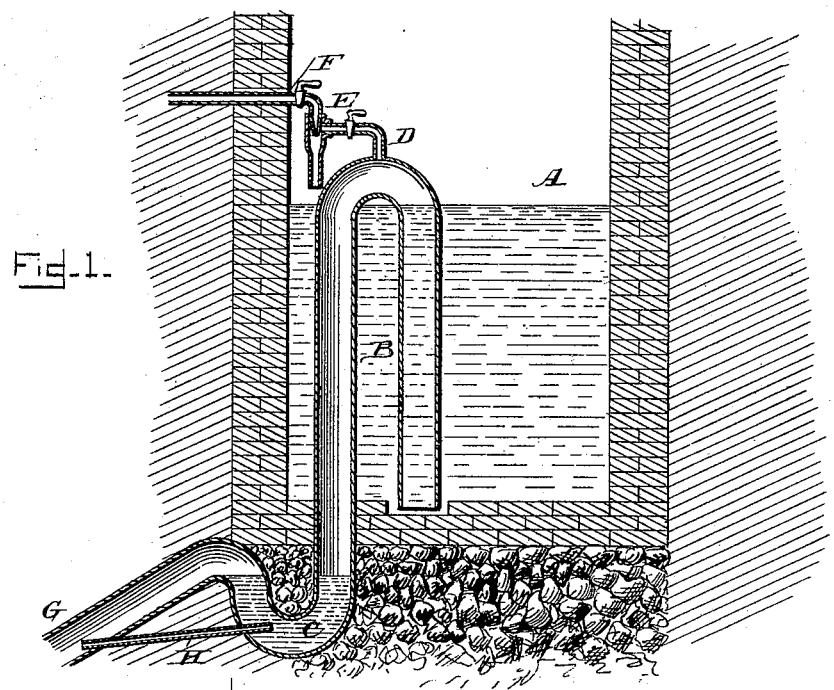
Figure 2:
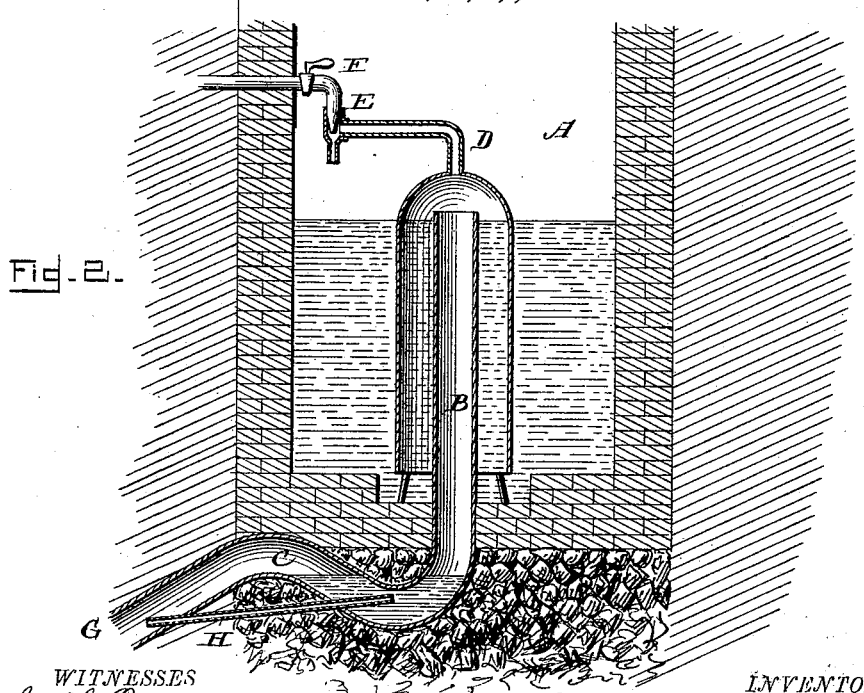

Figure 1 is a sectional view of a tank provided with my improved flushing device, and Fig. 2 is a sectional view showing the same applied to a different form of siphon.

Similar letters of reference indicate corresponding parts in both the figures.

This invention relates to automatic flushing-tanks, as will be hereinafter more fully described, and pointed out in the claims.

Referring to the accompanying drawings, A represents a tank, provided with an outlet-pipe, B, formed into a siphon, and being provided with a trap, C. A pipe, D, communicates with the interior of the pipe B at the top or bend, the end of which is provided with an enlarged portion or T-connection, E. An inlet-pipe, F, has its end within this enlarged portion or T, the orifice of said pipe being smaller than the diameter of the enlarged portion, and a trifle below the center. Each of these pipes is provided with a regulating-cock.
Connecting the lower part of the trap C with the sewer-pipe G is a short pipe, H, which is a trifle smaller than the inlet-pipe F.

The operation of the device is as follows: As the water flows through the enlarged portion of the pipe D a suction is created, which draws a current of air through the pipe D, which in turn exhausts the air from the siphon, which is in communication with the sewer. As the water rises in the tank the short arm of the siphon is filled until it finally reaches the bend at the top and commences to overflow. The amount of this overflow will equal the amount of water that enters the tank through the inlet-pipe, and as this amount is greater than that which can pass out through the pipe H the trap will eventually become filled or sealed, which will prevent any more air from entering the siphon. As the air is exhausted from the siphon the flow through the pipe H will cease and the siphon soon become full of water, as the overflow still continues as the tank is gradually filled. As soon as both arms of the siphon are filled with water the water commences flowing out through the escape-pipe, thus causing a complete flushing of the tank and pipes. After the tank has become emptied the water that still remains in the trap is conveyed through the pipe H, and the tank is ready to commence filling again. As soon as the top of the siphon is reached the same operation is repeated, and the tank and pipes are again flushed.

Having thus described my invention, I claim and desire to secure by Letters Patent of the United States—

1. The combination, with a siphon, of a pipe at its top, the end of said pipe being provided with an enlarged portion, an inlet-pipe the end of which is within said enlarged portion, a trap at the bottom of the siphon, and a pipe connecting said trap with the sewer-pipe, as shown and described.

2. The combination, with the top of a siphon, of a pipe the end of which is provided with a T-connection, an inlet-pipe the end of which is within said T, a trap at the bottom of the siphon, and a pipe connecting said trap with the sewer-pipe, said pipe being of a smaller diameter than the inlet-pipe, as shown and described.

In testimony that I claim the foregoing as my own I have hereunto affixed my signature in presence of two witnesses.

ANDREW ROSEWATER.

Witnesses:
A. B. HUNT,
J. N. FLYNN.